(12) United States Patent
Lattore Costa

(10) Patent No.: US 10,739,949 B2
(45) Date of Patent: Aug. 11, 2020

(54) PORT EXPANSION DEVICE FOR AN AIRCRAFT

(71) Applicant: AIRBUS OPERATIONS (S.A.S.), Toulouse (FR)

(72) Inventor: Pau Lattore Costa, Toulouse (FR)

(73) Assignee: AIRBUS OPERATIONS (SAS), Toulouse (FR)

( * ) Notice: Subject to any disclaimer, the term of this patent is extended or adjusted under 35 U.S.C. 154(b) by 61 days.

(21) Appl. No.: 16/143,974

(22) Filed: Sep. 27, 2018

(65) Prior Publication Data

US 2019/0102051 A1 Apr. 4, 2019

(30) Foreign Application Priority Data

Oct. 4, 2017 (FR) .................................... 17 59303

(51) Int. Cl.
*G06F 3/0482* (2013.01)
*B64D 43/00* (2006.01)
(Continued)

(52) U.S. Cl.
CPC .......... *G06F 3/0482* (2013.01); *B64D 43/00* (2013.01); *G06F 3/048* (2013.01); *G06F 3/0483* (2013.01);
(Continued)

(58) Field of Classification Search
CPC .... G06F 3/0482; G06F 3/0483; G06F 9/4415; G06F 9/54; B64D 43/00
See application file for complete search history.

(56) References Cited

U.S. PATENT DOCUMENTS 8,255,095 B2 * 8/2012 Girlich ............... G05B 19/0421
326/101
8,301,867 B1 * 10/2012 Mazuk ................ G06F 11/1625
398/66
(Continued)

FOREIGN PATENT DOCUMENTS

CN 104 683 322 6/2015

OTHER PUBLICATIONS

Newby et al., "Dlink+CPDLC Users Guide," Spectralux Avionics, 2011 (102 pages). (Year: 2011).*
(Continued)

*Primary Examiner* — Eric J. Bycer
(74) *Attorney, Agent, or Firm* — Nixon & Vanderhye P.C.

(57) ABSTRACT

A port expansion device is connected to a user interface terminal in an aircraft. The user interface terminal displays a first selection page designed to make it possible to select a peripheral system from among a first set of peripheral systems connected to the user interface terminal, so as to transfer graphical interface control to the selected peripheral system. A second set of peripheral systems are connected to the user interface terminal via control circuitry of the port expansion device, which emulates peripheral system behaviour. The control circuitry exports a name representative of a menu navigation action on the user interface terminal, and emulates a second selection page in the style of the first selection page generated by the user interface terminal, making it possible to select a peripheral system from among the second set of peripheral systems. The port expansion is thus performed transparently.

18 Claims, 5 Drawing Sheets

(51) Int. Cl.
  *G06F 9/54* (2006.01)
  *G06F 3/0483* (2013.01)
  *G06F 9/4401* (2018.01)
  *G06F 9/451* (2018.01)
  *G06F 3/048* (2013.01)

(52) U.S. Cl.
  CPC ............ *G06F 9/4415* (2013.01); *G06F 9/451* (2018.02); *G06F 9/54* (2013.01)

(56) References Cited

U.S. PATENT DOCUMENTS

| | | | | |
|---|---|---|---|---|
| 2003/0189597 | A1* | 10/2003 | Anderson | G06F 3/0481 715/778 |
| 2006/0233204 | A1* | 10/2006 | Pomaranski | G06F 11/2005 370/535 |
| 2008/0098307 | A1* | 4/2008 | Corbefin | G06F 3/14 715/733 |
| 2008/0127159 | A1* | 5/2008 | Regenmorter | G06F 8/65 717/168 |
| 2008/0130517 | A1* | 6/2008 | Lee | H04L 41/0886 370/254 |
| 2008/0246633 | A1* | 10/2008 | Pouzolz | G01C 23/00 340/971 |
| 2009/0240840 | A1* | 9/2009 | Habben | G05B 19/0426 710/10 |
| 2010/0161157 | A1* | 6/2010 | Guilley | G05B 23/0272 701/3 |
| 2012/0233495 | A1* | 9/2012 | Einig | G06F 11/1658 714/4.5 |
| 2012/0271616 | A1 | 10/2012 | Ludwig et al. | |
| 2014/0287685 | A1* | 9/2014 | Griffin | H04W 12/00524 455/41.2 |

OTHER PUBLICATIONS

Search Report cited in FR 1759303, completed May 18, 2018, six pages.

\* cited by examiner

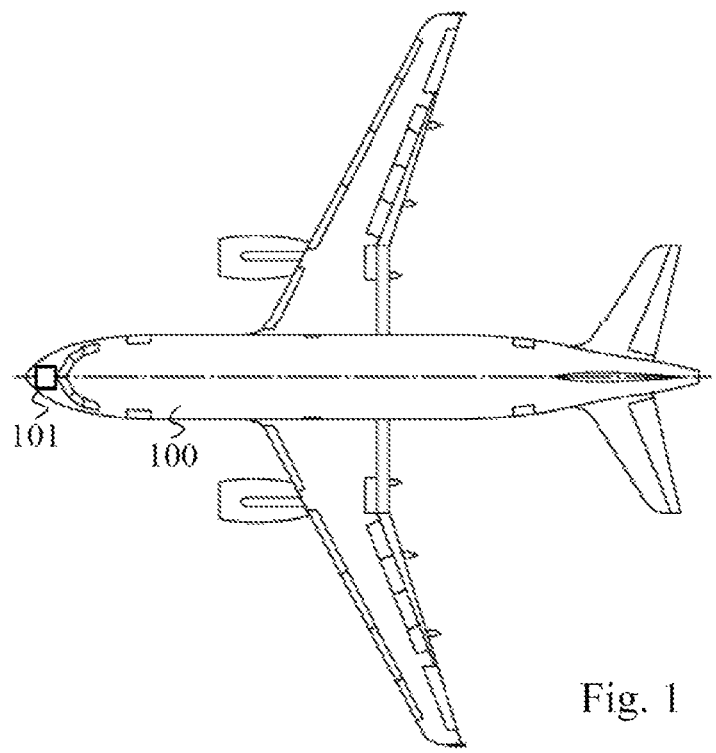
Fig. 1
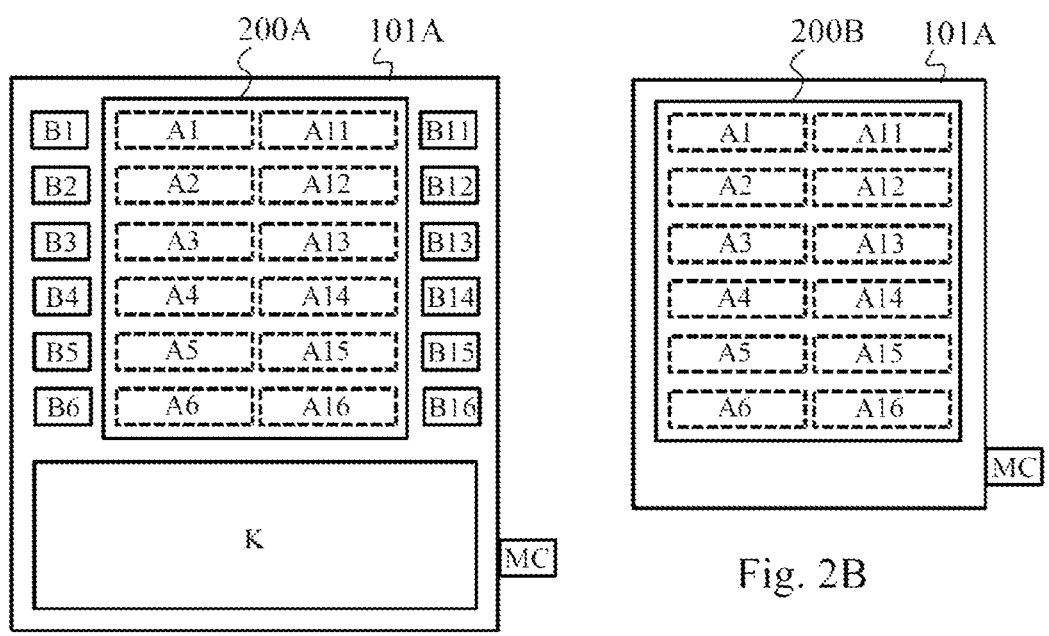
Fig. 2A
Fig. 2B

PORT EXPANSION DEVICE FOR AN AIRCRAFT

RELATED APPLICATION

This application claims priority to French Patent Application 17 59303 filed 4 Oct. 2017, the entirety of which is incorporated by reference.

TECHNICAL FIELD

The present technology relates to a port expansion device intended to be connected to a user interface terminal in an aircraft, and to aircraft including such port expansion devices. The present technology relates to a method implemented by such a port expansion device, and to a computer program product designed to implement this method and to an information storage medium on which such a computer program is stored.

BACKGROUND

In aircraft, user interface terminals, called MCDU (for 'multipurpose control and display unit' in English), allow a user (pilot, co-pilot) to control various systems, called peripheral systems here, of the aircraft. These user interface terminals are thus used as a common platform for interaction with the user in order to control these peripheral systems.

These user interface terminals respectively include a screen, on which the names of the peripheral systems connected to the user interface terminals are displayed via a selection page. When the user selects a peripheral system via this selection page, the user interface terminal in question hands over to the selected peripheral system. The control operations performed on said user interface terminal are then transferred to the selected peripheral system for processing, and the graphical interface displayed on the screen is generated by the selected peripheral system.

One problem that is encountered with these user interface terminals is that they have a limited number of ports allowing peripheral systems to be connected thereto. It is desirable to mitigate this drawback. It is desirable in particular to provide a solution allowing the number of ports of these user interface terminals to be expanded, without having to replace them with user interface terminals having a larger number of ports. It is also desirable to provide a solution that makes it possible to expand the number of ports of these user interface terminals, transparently for the user interface terminal, for the peripheral systems and for the user.

SUMMARY

The technology herein provides a port expansion device intended to be connected to a user interface terminal in an aircraft, the user interface terminal being intended to connect peripheral systems directly to it and to display, on a screen of said user interface terminal, a selection page designed to allow a user to select a peripheral system from among said peripheral systems so as to transfer graphical interface control to the selected peripheral system. With other peripheral systems being connected to the user interface terminal via control circuitry of the port expansion device, the port expansion device is such that the control circuitry is designed to emulate peripheral system behaviour and implements: means for responding to a name request coming from the user interface terminal, with a name representative of a menu navigation action on the user interface terminal; when the user interface terminal performs a graphical interface control transfer from said user interface terminal to said control circuitry, means for emulating another selection page in the style of the selection page generated by the user interface terminal, designed to allow the user to select a peripheral system from among other peripheral systems connected to said control circuitry; and when said control circuitry detects a selection of a peripheral system from among said other peripheral systems by virtue of the graphical interface control transfer, means for performing a graphical interface control transfer from said user interface terminal to said selected peripheral system, the control circuitry acting as a relay between said selected peripheral system and the user interface terminal.

Thus, the existing number of ports on the user interface terminal is expanded by virtue of the port expansion device, and is done so transparently for said user interface terminal, since the control circuitry emulates peripheral system behaviour. In addition, as the control circuitry emulates another selection page in the style of the selection page generated by the user interface terminal, the port expansion is transparent for the user. Lastly, as the control circuitry acts as a relay between the peripheral systems that are connected to it and the user interface terminal, the port expansion is also transparent for the peripheral systems for which the control circuitry acts as a relay.

According to one particular embodiment, the port expansion device includes a connector intended to connect the port expansion device to the user interface terminal and wiring intended to connect said other peripheral systems, and the control circuitry is included in a housing linking said connector and said wiring.

According to one particular embodiment, the port expansion device includes further wiring intended to connect the peripheral systems to be connected directly to said user interface terminal, and said further wiring is connected directly to said connector.

According to one particular embodiment, the connector is a female connector in accordance with the ARINC-739 standard.

According to one particular embodiment, said other selection page includes an element reserved for returning to the selection page generated by the user interface terminal, and when said element is selected by the user, the control circuitry implements means for performing a transfer of graphical interface control back to said user interface terminal.

According to one particular embodiment, in order to define said other selection page, the control circuitry implements means for recovering a name of each peripheral system that is connected to it by sending a name request to each said peripheral system.

The technology herein also provides a system for controlling peripheral systems, including a user interface terminal, peripheral systems and a port expansion device as outlined above, a subset of the peripheral systems being connected directly to the user interface terminal and another subset of the peripheral systems being connected to the user interface terminal by way of the control circuitry of the port expansion device.

Another example embodiment provides an aircraft including a control system such as outlined above.

Another example embodiment provides a method implemented by control circuitry of a port expansion device connected to a user interface terminal in an aircraft, the user interface terminal being designed to connect peripheral systems directly to it and to display, on a screen of said user interface terminal, a selection page designed to allow a user to select a peripheral system from among said peripheral systems so as to transfer graphical interface control to the selected peripheral system. With other peripheral systems being connected to the user interface terminal via the control circuitry, the method is such that the control circuitry emulates peripheral system behaviour and implements the following steps: responding to a name request coming from the user interface terminal, with a name representative of a menu navigation action on the user interface terminal; when the user interface terminal performs a graphical interface control transfer from said user interface terminal to said control circuitry, emulating another selection page in the style of the selection page generated by the user interface terminal, designed to allow the user to select a peripheral system from among other peripheral systems connected to said control circuitry; and when said control circuitry detects a selection of a peripheral system from among said other peripheral systems by virtue of the graphical interface control transfer, performing a graphical interface control transfer from said user interface terminal to said selected peripheral system, the control circuitry acting as a relay between said selected peripheral system and the user interface terminal.

Another example embodiment provides a computer program, which may be stored on a medium and/or downloaded from a communication network, so as to be read by a processor of the port expansion device outlined above. This computer program comprises instructions for implementing the abovementioned method when said program is executed by the processor. Another example embodiment provides an information storage medium on which such a computer program is stored.

DESCRIPTION OF THE DRAWINGS

The abovementioned features of the invention, along with others, will become more clearly apparent upon reading the following description of an exemplary embodiment, said description being given with reference to the appended drawings, in which:

FIG. 1 shows a plan view of an example aircraft in which an assembly formed of a user interface terminal and of a port expansion device is installed;

FIG. 2A schematically illustrates the user interface terminal in a first example layout, and FIG. 2B schematically illustrates the user interface terminal in a second example layout;

DETAILED DISCLOSURE OF EMBODIMENTS OF THE INVENTION

Figure 3:
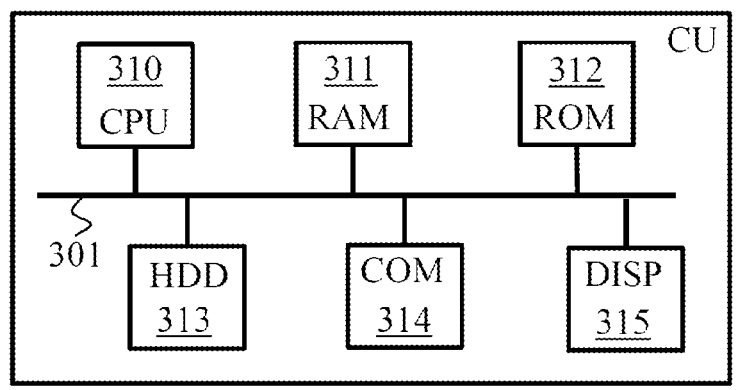
FIG. 3 schematically illustrates an exemplary hardware architecture of a control unit of the user interface terminal.

FIG. 1 shows an aircraft 100 in a plan view. The aircraft 100 is equipped with a set of computerized devices intended to provide assistance to the pilot of the aircraft 100. More generally, this set of computerized devices is intended to allow the aircraft 100 to be operated. This set of computerized devices includes a control system 101 formed of a user interface terminal 101A and of a port expansion device 101B (FIG. 5), as described hereinafter, and a plurality of peripheral systems (also called subsystems) at least one subset of which is connected to said user interface terminal 101A by way of the port expansion device 101B. The port expansion device 101B thus forms wiring that makes it possible to connect said peripheral systems to said user interface terminal 101A.

In one particular embodiment, the user interface terminal 101A is of MCDU type, preferably in accordance with the ARINC-739 standard. The user interface terminal 101A may be a variant of MCDU, called KCCU (for 'keyboard cursor control unit' in English).

The user interface terminal 101A has a limited number of ports for directly connecting peripheral systems, and the port expansion device 101B is designed to expand this number of ports so as to make it possible to connect a larger number of peripheral systems, and to do so transparently for the user interface terminal 101A.

FIG. 2A schematically illustrates the user interface terminal 101A in a first example layout. In FIG. 2A, the user interface terminal 101A includes a screen 200A, a set of twelve buttons B1 to B6 and B11 to B16 at the edge of the screen 200A, and a keyboard K. The user interface terminal 101A furthermore includes a male connector MC intended to connect the port expansion device 101B. Preferably, the male connector MC is in accordance with the ARINC-739 standard and therefore meets the requirements of the MS 24264R military device standard. As a variant, the user interface terminal 101A may be equipped with a female connector as a replacement for the male connector MC (which means that the port expansion device 101B is then equipped with a corresponding male connector).

The user interface terminal 101A is designed to display graphical interface GUI (for 'graphical user interface' in English) pages on the screen 200A. The displayed graphical interface GUI pages are generated by the user interface terminal 101A, and when a user has selected a peripheral system via a selection page, the displayed graphical interface GUI pages are generated by said selected peripheral system until said selected peripheral system hands back over to the user interface terminal 101A. In other words, once a peripheral system is selected via the selection page, a user interface control transfer is made: the commands made by the user on the keyboard K and on the buttons B1 to B6 and B11 to B16 are transferred by the user interface terminal 101A to the selected peripheral system via the wiring formed by the port expansion device 101B, and the graphical interface displayed on the screen is provided by said selected peripheral system to the user interface terminal 101A via the wiring formed by the port expansion device 101B. Some keys of the keyboard K and/or possibly some buttons B1 to B6 and B11 to B16 may remain in the scope of the control of the user interface terminal 101A, for example in order to allow the user to request the selected peripheral system to hand back to the user interface and thus to return to the selection page or to another menu page managed by the user interface terminal 101A.

More precisely, the selection page is a graphical interface GUI page generated by the user interface terminal 101A. This selection page displays a list of the peripheral systems connected to the user interface terminal 101A via the wiring formed by the port expansion device 101B. Names of the peripheral systems in question are displayed in respective display areas A1 to A6 and A11 to A16 on the selection page. These display areas A1 to A6 and A11 to A16 are displayed so as to correspond to the buttons B1 to B6 and B11 to B16 at the edge of the screen, respectively. By pressing one of the buttons B1 to B6 and B11 to B16, the user selects the peripheral system whose name is written in that display area A1 to A6 and A11 to A16 that is displayed so as to correspond to the button that is pressed. One exemplary selection page displayed on the screen of the user interface terminal 101A is shown hereinafter with reference to FIG. 4A.

FIG. 2B schematically illustrates the user interface terminal 101A in a second example layout. This second layout is similar to the first layout shown in FIG. 2A. The difference lies in the presence of a touchscreen 200B as a replacement for the screen 200A. Thus, the display areas A1 to A6 and A11 to A16 are active areas, in the sense that touching one of said display areas makes it possible to select the peripheral system whose name is displayed on said display area. The touchscreen may furthermore display other graphical elements, such as for example a virtual keyboard (not shown in FIG. 2B).

FIG. 3 schematically illustrates an exemplary hardware architecture of a control unit CU included in the user interface terminal 101A. The control unit CU then includes, linked by a communication bus 301: a processor or CPU (for 'central processing unit' in English) 310; a random access memory RAM 311; a read-only memory ROM 312; a storage unit, such as a hard disk HDD (for 'hard disk drive' in English) 313; a set of communication interfaces COM 314 making it possible to connect the control unit CU to a plurality of peripheral systems via the male connector MC; and a connection interface DISP (for 'display' in English) for connection to the screen of the user interface terminal 101A.

The processor CPU 310 is capable of executing instructions loaded in the memory RAM 311 from the memory ROM 312, from an external memory (not shown), from a storage medium (such as the hard disk HDD), or from a communication network (not shown). When the control unit CU is powered up, the processor CPU 310 is capable of reading instructions from the memory RAM 311 and of executing them. These instructions form a computer program that causes the processor CPU 310 to implement all or some of the algorithms and of the steps described hereinafter with reference to FIGS. 7 and 9.

All or some of the algorithms and of the steps described hereinafter with reference to FIGS. 7 and 9 may thus be implemented in software form through the execution of a set of instructions by a programmable machine, for example a DSP ('digital signal processor' in English) or a microcontroller, or be implemented in hardware form by a machine or a dedicated component, for example an FPGA (for 'field-programmable gate array' in English) or ASIC (for 'application-specific integrated circuit' in English) component. Generally, the user interface terminal 101A includes electronic circuitry designed to implement the algorithms and the steps described hereinafter with reference to FIGS. 7 and 9 in software and/or hardware form.

Figure 4A:
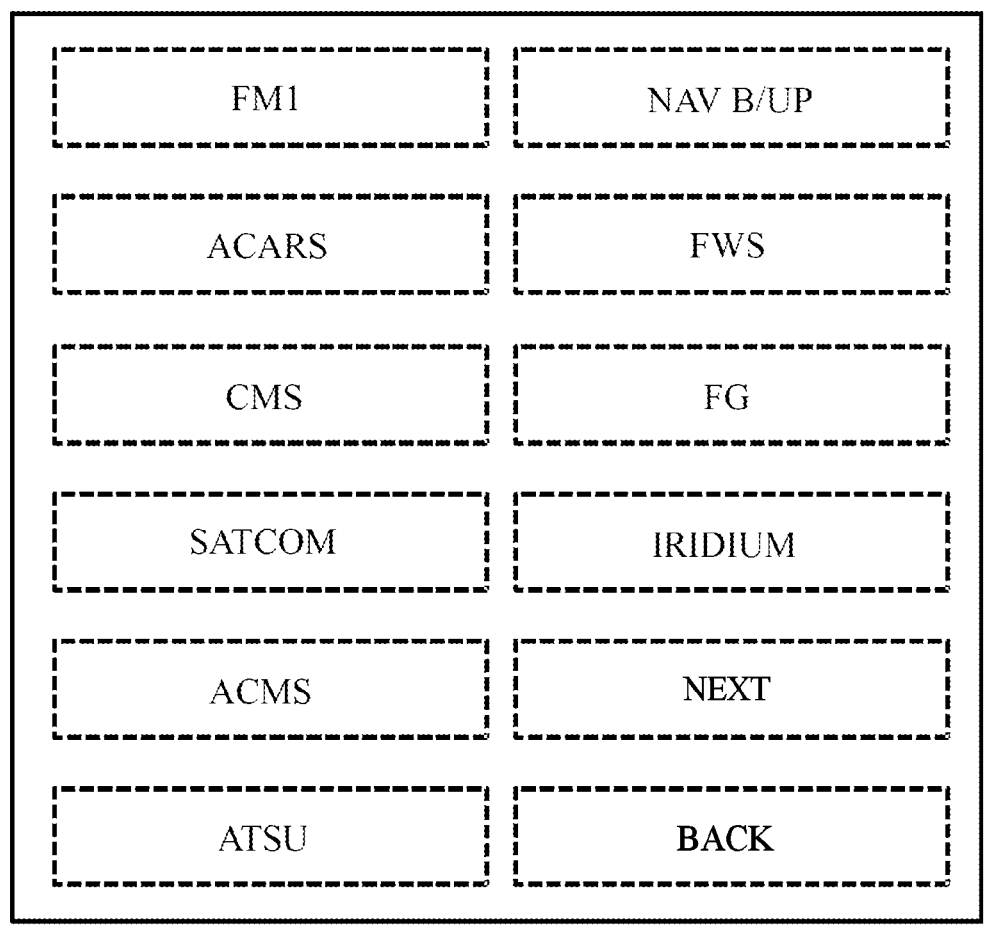
FIG. 4A schematically illustrates a first exemplary display obtained on a screen of the user interface terminal, and FIG. 4B schematically illustrates a second exemplary display obtained on the screen of the user interface terminal.

FIG. 4A schematically illustrates a first exemplary display obtained on the screen of the user interface terminal 101A. The first exemplary display shows the abovementioned selection page.

The button B16 (or if the screen is a touchscreen, the active display area A16) is, in this first example, reserved for returning to a graphical interface GUI page, generated by the user interface terminal 101A, with a higher hierarchy level than the selection page. Therefore, the display area A16 is labelled 'BACK' and does not correspond to a peripheral system. Pressing the button B16 (or if the screen is a touchscreen, the active display area A16) therefore does not select a peripheral system from among the peripheral systems connected to the user interface terminal 101A via the port expansion device 101B.

In this first exemplary display, which corresponds to the selection page generated by the user interface terminal 101A:

the display area A1 is labelled FM1 (for 'Flight Management #1' in English) and the corresponding peripheral system is a flight management system;

the display area A2 is labelled ACARS (for 'aircraft communication addressing and reporting system' in English) and the corresponding peripheral system is a system for coded communication with the ground;

the display area A3 is labelled CMS (for 'cabin management system' in English) and the corresponding peripheral system is a cabin management system;

the display area A4 is labelled SATCOM (short for 'satellite communications' in English) and the corresponding peripheral system is a satellite communication system;

the display area A5 is labelled ACMS (for 'aircraft condition monitoring system' in English) and the corresponding peripheral system is a maintenance assistance system;

the display area A6 is labelled ATSU (for 'air traffic services unit' in English) and the corresponding peripheral system is an air traffic control system;

the display area A11 is labelled NAV B/UP (for 'navigation backup' in English) and the corresponding peripheral system is a backup navigation system;

the display area A12 is labelled FWS (for 'flight warning system' in English) and the corresponding peripheral system is a monitoring and warning system;

the display area A13 is labelled FG (for 'flight guidance' in English) and the corresponding peripheral system is a flight guidance system;

the display area A14 is labelled IRIDIUM, a reference to the company of the same name specializing in aeronautical communication systems, and the corresponding peripheral system is therefore a communication system; and the display area A15 is labelled NEXT. This name does not correspond to a peripheral system as such. Pressing the button B15 (or if the screen is a touchscreen, the active display area A15) therefore does not select a peripheral system from among the peripheral systems connected to the user interface terminal 101A so as to hand over to it, but hands over to control circuitry CC integrated into the port expansion device 101B. This control circuitry CC emulates peripheral system behaviour, so as to be transparent for the user interface terminal 101A. As detailed hereinafter, this control circuitry CC makes it possible to expand the number of peripheral systems that are able to be connected simultaneously to the user interface terminal 101A.

Figure 4B:
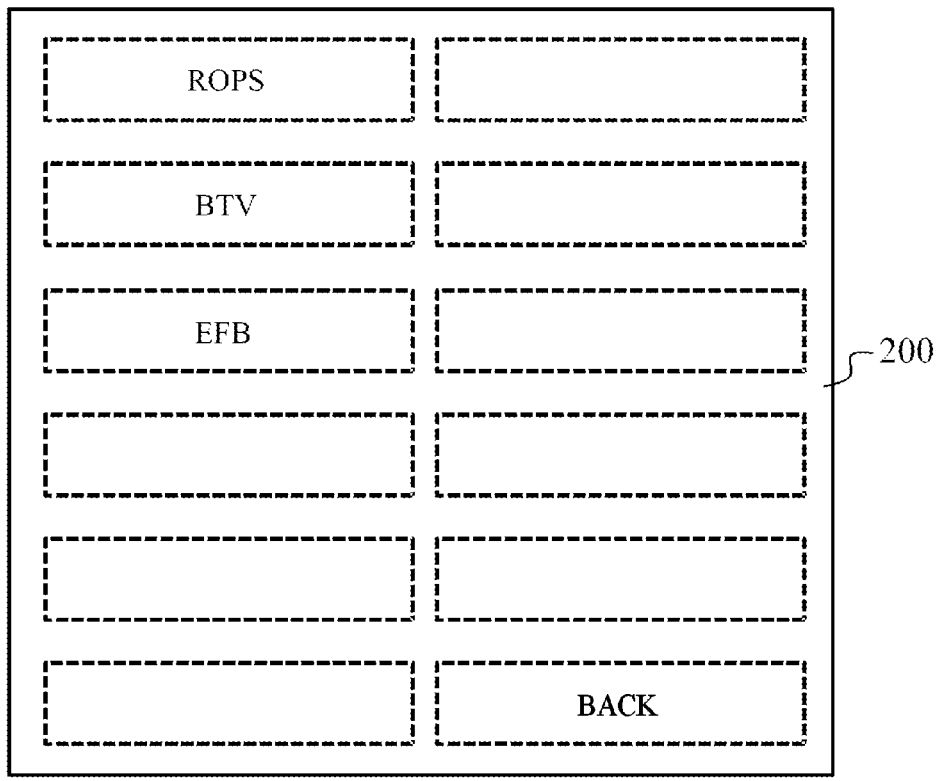

FIG. 4B schematically illustrates a second exemplary display obtained on the screen of the user interface terminal 101A. This second exemplary display corresponds to a graphical interface page generated by the control circuitry CC when the user interface terminal 101A hands over to said control circuitry CC. The graphical interface page thus generated by the control circuitry CC is then designed to allow the user to select peripheral systems that are not able to be detected directly by the user interface terminal 101A. This graphical interface page generated by the control circuitry CC is in the style of the selection page generated by the user interface terminal 101A, such that the user does not realize that control has been handed over to said control circuitry CC. In other words, the control circuitry CC emulates a selection page. In this way, the presence of this control circuitry CC is completely transparent for the user.

In one particular embodiment illustrated in FIG. 4B, an element is reserved for returning to the selection page generated by the user interface terminal 101A. The button B16 (or if the screen is a touchscreen, the active display area A16) is for example used for this purpose. As a result, the display area A16 is also labelled 'BACK' and does not correspond to a peripheral system. Pressing the button B16 (or if the screen is a touchscreen, the active display area A16) therefore does not select a peripheral system from among the peripheral systems that are connected to the port expansion device 101B but that are not able to be detected directly by the user interface terminal 101A. Specifically, pressing the button B16 (or if the screen is a touchscreen, the active display area A16) hands back over to the user interface terminal 101A. In other words, the control circuitry CC then transfers graphical interface control back to said user interface terminal 101A so as to display the actual selection page.

In this second exemplary display, which corresponds to the graphical interface page generated by the control circuitry CC in the form of an emulated selection page:

the display area A1 is labelled ROPS (for 'runway overrun prevention system' in English) and the corresponding peripheral system is a runway exit prevention system;

the display area A2 is labelled BTV (for 'brake to vacate' in English) and the corresponding peripheral system is a system for controlling braking distance on landing; and the display area A3 is labelled EFB (for 'electronic flight bag' in English) and the corresponding peripheral system is a computerized assistance system for the pilot including reference manuals and other applications specific to flight management by the pilot.

The other display areas are left free in FIG. 4B. Other peripheral systems may be connected to the control circuitry CC, however, and thus appear on the graphical interface page generated by the control circuitry CC in an emulated form of said selection page generated by the user interface terminal 101A. Thus, by virtue of the control circuitry CC, these three peripheral systems may be used by the user by manipulating the user interface terminal 101A, whereas just one peripheral system from among these three peripheral systems would have been able to be connected to the user interface terminal 101A without this control circuitry CC being present.

Figure 5:
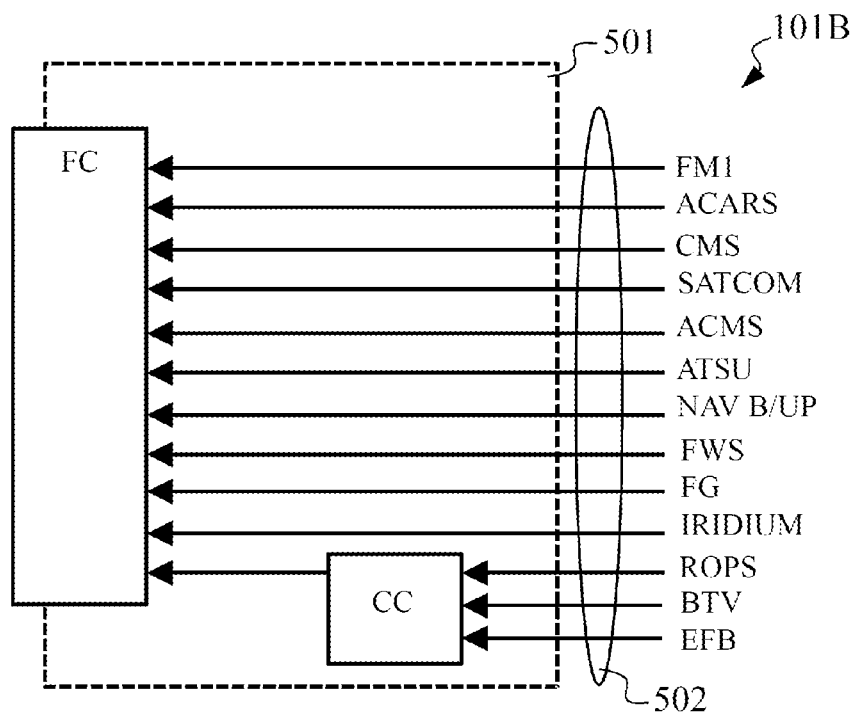
FIG. 5 schematically illustrates an exemplary port expansion device intended to be connected to the user interface terminal.

FIG. 5 schematically illustrates the port expansion device 101B, which includes the control circuitry CC already outlined.

The port expansion device 101B includes a female connector FC allowing the port expansion device 101B to be connected physically to the user interface terminal 101A. The female connector FC is preferably in accordance with the ARINC-739 standard.

The port expansion device 101B includes wiring making it possible to connect peripheral systems directly to the user interface terminal 101A via the female connector FC. This is the case, in an illustrative manner, for the FM1, ACARS, CMS, SATCOM, ACMS, ATSU, NAV B/UP, FWS, FG and IRIDIUM peripheral systems. The port expansion device 101B includes further wiring that makes it possible to connect, via the control circuitry CC, other peripheral systems that are not all able to be connected directly to the user interface terminal 101A, due to the lack of ports on said user interface terminal 101A. This is the case, in an illustrative manner, for the peripheral systems ROPS, BTV and EFB. This wiring thus forms a bundle 502, and the control circuitry CC is incorporated into an electrically insulating housing 501 assembling the bundle 502 with contactors of the female connector FC, providing an electrical link with the male connector MC of the user interface terminal 101A. It is thus possible to use one and the same connector shape factor as that which would be used if the number of peripheral systems to be connected were not to exceed the connection capability of the user interface terminal 101A.

It should be noted that the wiring linking peripheral systems directly to the user interface terminal 101A may, as a variant, be formed independently of the wiring of the other peripheral systems to the user interface terminal 101A via the control circuitry CC, and thus rely on one or more connectors separate from the female connector FC of the port expansion device 101B.

Figure 6:
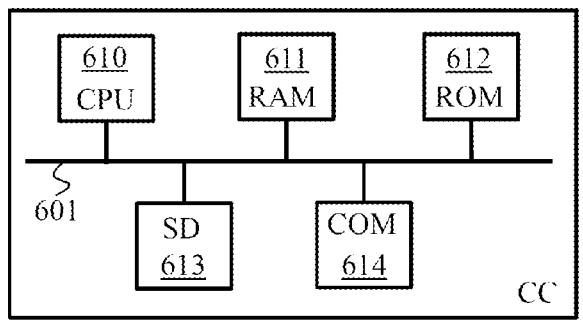
FIG. 6 schematically illustrates an exemplary hardware architecture of control circuitry included in the port expansion device.

FIG. 6 schematically illustrates an exemplary hardware architecture of the control circuitry CC included in the port expansion device 101B. The control circuitry CC then includes, linked by a communication bus 601: a processor or CPU 610; a random access memory RAM 611; a read-only memory ROM 612; a storage unit, such as an SD card reader 613, or an electrically erasable programmable read-only memory EEPROM, such as a Flash memory; a set of communication interfaces COM 614 making it possible to connect the control circuitry CC to the user interface terminal 101A via the male connector MC, on the one hand, and to connect the control circuitry CC to a plurality of peripheral systems, on the other hand.

The processor CPU 610 is capable of executing instructions loaded in the memory RAM 611 from the memory ROM 612, from an external memory (not shown), from a storage medium (such as an SD card), or from a communication network (not shown). When the control circuitry CC is powered up, the processor CPU 610 is capable of reading instructions from the memory RAM 611 and of executing them. These instructions form a computer program that causes the processor CPU 610 to implement all or some of the algorithms and of the steps described hereinafter with reference to FIGS. 8 and 10.

All or some of the algorithms and of the steps described hereinafter with reference to FIGS. 8 and 10 may thus be implemented in software form through the execution of a set of instructions by a programmable machine, for example a processor DSP or a microcontroller, or be implemented in hardware form by a machine or a dedicated component, for example an FPGA or ASIC component. Generally, the port expansion device 101B includes electronic circuitry designed to implement the algorithms and the steps described hereinafter with reference to FIGS. 8 and 10 in software and/or hardware form.

In terms of electric power supply, the control circuitry CC is preferably supplied with power by a branch from a cable, present in the bundle 502 that is intended to supply the user interface terminal 101A with power. As the control circuitry CC is of low complexity, supplying said control circuitry CC with power in addition to the user interface terminal 101A has a negligible effect on the electric power supply energy budget.

Figure 7:
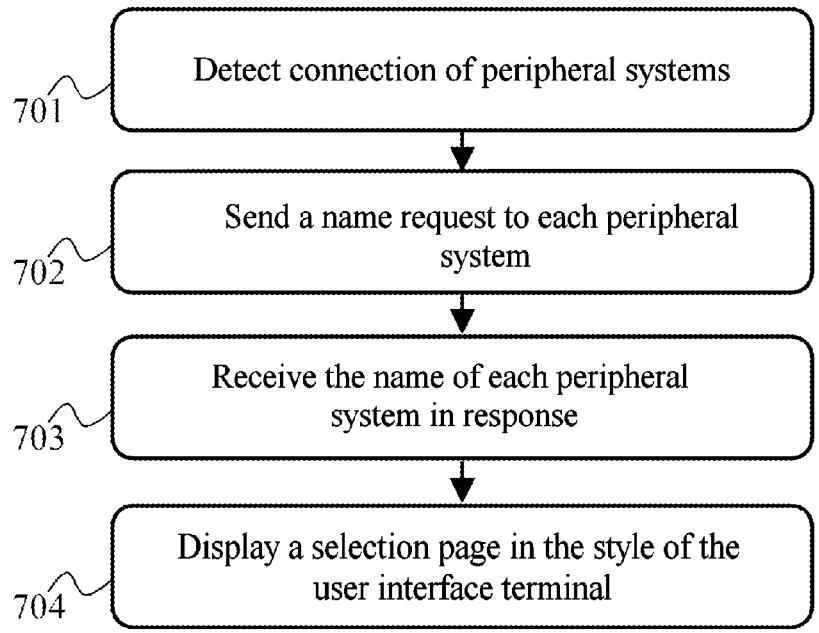
FIG. 7 schematically illustrates an exemplary algorithm for the display of a graphical interface page by the user interface terminal, making it possible to obtain the first exemplary display of FIG. 4A.

FIG. 7 schematically illustrates an exemplary algorithm for the display of the selection page by the user interface terminal 101A, making it possible in particular to obtain the first exemplary display of FIG. 4A.

In a step 701, the user interface terminal 101A detects that peripheral systems are connected physically to said user interface terminal 101A. The user interface terminal 101A does not know that at least one of the detected peripheral systems is actually the control circuitry CC (specifically, there may be a plurality of such control circuitry CC systems within the same port expansion device 101B). The other detected peripheral systems are those that are connected directly to the user interface terminal 101A, the remaining peripheral systems being, from the point of view of the user interface terminal 101A, masked by the control circuitry CC.

In a step 702, the user interface terminal 101A sends a name request to each connected peripheral system. This triggers a procedure within the control circuitry CC, as described hereinafter with reference to FIG. 8.

In a step 703, the user interface terminal 101A receives in response the name of each connected peripheral system, including the name provided by the control circuitry CC.

In a step 704, the user interface terminal 101A displays the selection page. The selection page is displayed in a style that is specific to the user interface terminal 101A (since it is the user interface terminal 101A that generates this part of the graphical interface presented to the user). The selection page lists the responses received in step 703, such as for example described above with reference to FIG. 4A.

Figure 8:
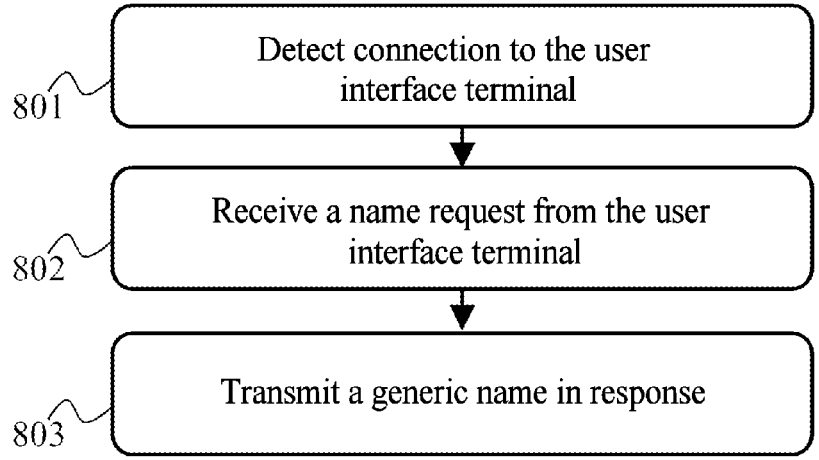
FIG. 8 schematically illustrates an exemplary algorithm for response, by the control circuitry included in the port expansion device, to a request from the user interface terminal, so as to make it possible to obtain the first exemplary display of FIG. 4A.

FIG. 8 schematically illustrates an exemplary algorithm for response, by the control circuitry CC, to the request from the user interface terminal 101A sent in step 702.

In a step 801, the control circuitry CC detects being connected to the user interface terminal 101A.

In a step 802, the control circuitry CC receives the request transmitted by the user interface terminal 101A in step 702.

In a step 803, the control circuitry CC emulates peripheral system behaviour and responds to the request from the user interface terminal 101A with a name representative of a menu navigation action on the user interface terminal 101A. Such a name invites the user to select it in order to find other accessible peripheral systems. For example, the generic name provided by the control circuitry CC is: 'NEXT' (as indicated in FIG. 4A), 'NEXT PAGE', 'MORE', or ' . . . '. The user interface terminal 101A thus believes it has received the effective name of a peripheral system, but actually receives a name perceived by the user as being representative of a menu navigation action on the graphical interface of the user interface terminal 101A.

Figure 9:
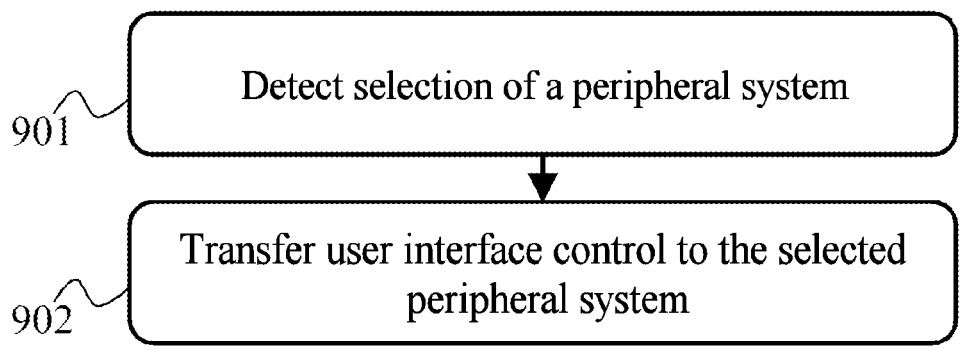
FIG. 9 schematically illustrates an exemplary algorithm for display management, by the user interface terminal, making it possible to obtain the second exemplary display of FIG. 4B.

FIG. 9 schematically illustrates an exemplary algorithm for display management, by the user interface terminal 101A, making it possible in particular to obtain the second exemplary display of FIG. 4B, and to do so transparently for said user interface terminal 101A.

In a step 901, the user interface terminal 101A detects a selection, by the user, of a peripheral system listed in the selection page generated by said user interface terminal 101A.

In a step 902, the user interface terminal 101A transfers user interface control to said peripheral system, that is to say that the user interface terminal 101A transfers the control operations performed by the user on the user interface terminal 101A to said peripheral system for processing, and said user interface terminal 101A receives the graphical interface to be displayed from said peripheral system.

If the selection relates to a peripheral system connected directly to the user interface terminal 101A, the user interface terminal 101A thus hands over to said peripheral system. If the selection relates to the control circuitry CC, the user interface terminal 101A thus hands over to the control circuitry CC as if said control circuitry CC were a peripheral system. This triggers a procedure within the control circuitry CC, such as described hereinafter with reference to FIG. 10. This allows the control circuitry CC to have the user interface terminal 101A display a selection page emulation, as illustrated by FIG. 4B.

Figure 10:
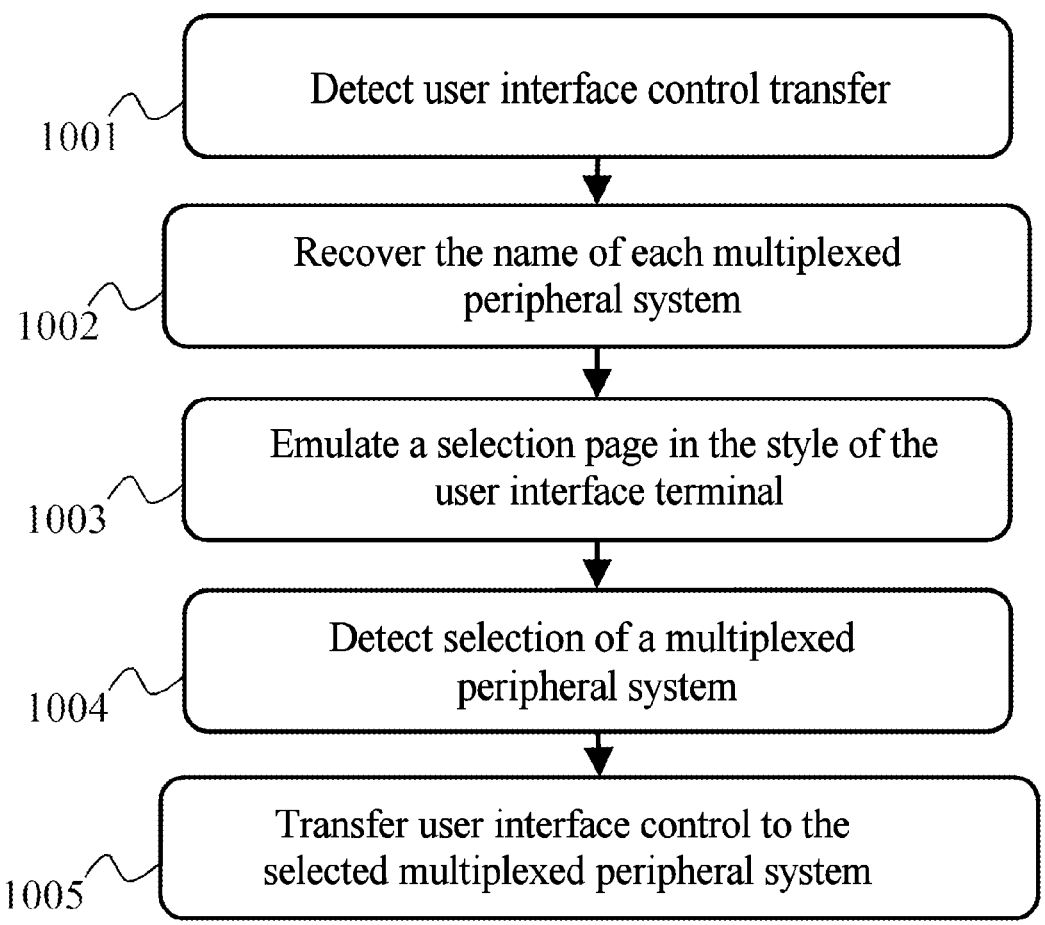
FIG. 10 schematically illustrates an exemplary algorithm for display management, by the control circuitry included in the port expansion device, so as to make it possible to obtain the second exemplary display of FIG. 4B.

FIG. 10 schematically illustrates an exemplary algorithm for display management, by the control circuitry CC, so as to make it possible to obtain the second exemplary display of FIG. 4B.

In a step 1001, the control circuitry CC detects a user interface control transfer from the user interface terminal 101A. Step 1001 follows step 902 performed by said user interface terminal 101A.

In a step 1002, the control circuitry CC recovers a name for each peripheral system connected to said control circuitry CC. For example, this name is written, by prior configuration, within a non-volatile memory of the control circuitry CC. Preferably, the control circuitry CC sends a name request to each peripheral system connected to said control circuitry CC, as does the user interface terminal 101A with respect to the peripheral systems that are connected directly to it. The control circuitry CC receives in response the name of each peripheral system connected to said control circuitry CC.

In a step 1003, the control circuitry CC emulates a selection page in the style of the selection page generated by the user interface terminal 101A, such that the user does not realize that control has been handed over to said control circuitry CC. The emulated selection page lists the peripheral systems whose name has been recovered in step 1002, such as for example described above with reference to FIG. 4B. The emulated selection page is thus transmitted to the user interface terminal 101A to be displayed on the screen.

In a step 1004, the control circuitry CC detects, by virtue of the control transfer, a selection, by the user, of a peripheral system listed in the selection page emulated by the control circuitry CC.

In a step 1005, the control circuitry CC transfers user interface control to said peripheral system, that is to say that the user interface terminal 101A transfers the control operations performed by the user on the user interface terminal 101A to said control circuitry CC, and said control circuitry CC transfers these control operations to said peripheral system for processing. In the other direction, the control circuitry CC receives the graphical interface to be displayed from said peripheral system, and then transfers this graphical interface to be displayed to said user interface terminal 101A.

The control circuitry CC thus acts as a transparent relay between the user interface terminal 101A and said peripheral system.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. A port expansion device connected to a user interface terminal in an aircraft, the user interface terminal being configured to connect a first set of peripheral systems directly to the user interface terminal and to display, on a screen of the user interface terminal, a first selection page displaying names of the peripheral systems in said first set of peripheral systems thereby allowing a user to select a peripheral system from said first set of peripheral systems so as to transfer graphical interface control to the selected peripheral system,
    wherein the port expansion device comprises control circuitry configured to connect a second set of peripheral systems to the user interface terminal, the control circuitry being further configured to:
        respond to a name request coming from the user interface terminal with a name representative of a menu navigation action on the user interface terminal;
        upon receipt of graphical interface control transferred from the user interface terminal, emulate a second selection page in a same style as the first selection page, wherein the second selection page displays names of the peripheral systems in said second set of peripheral systems thereby allowing the user to select a peripheral system from the second set of peripheral systems; and
        upon detecting a selection of a peripheral system from said second set of peripheral systems, transfer graphical interface control from the control circuitry to the selected peripheral system, thereby acting as a relay between the selected peripheral system and the user interface terminal.

2. The port expansion device according to claim 1, further comprises a connector configured to connect the port expansion device to the user interface terminal and wiring configured to connect said second set of peripheral systems, wherein the control circuitry is included in a housing linking said connector and said wiring.

3. The port expansion device according to claim 2, further comprises additional wiring configured to connect the peripheral systems directly to the user interface terminal, wherein said additional wiring is connected directly to said connector.

4. The port expansion device according to claim 2, wherein the connector is a female connector in accordance with an ARINC-739 standard.

5. The port expansion device according to claim 1, wherein said second selection page includes an element enabling returning to the first selection page generated by the user interface terminal, and the control circuitry is configured to, upon detecting a selection of said element by the user, transfer graphical interface control back to the user interface terminal.

6. The port expansion device according to claim 1, wherein the control circuitry is further configured to recover a name of each peripheral system that is connected to the control circuitry by sending a name request to each said peripheral system, in generating said second selection page.

7. A control system for controlling peripheral systems, including a user interface terminal, peripheral systems and a port expansion device according to claim 1, a first subset of the peripheral systems being connected directly to the user interface terminal and a second subset of the peripheral systems being connected to the user interface terminal by way of the control circuitry of the port expansion device.

8. An aircraft including a control system according to claim 7.

9. A method performed by control circuitry of a port expansion device connected to a user interface terminal in an aircraft, the user interface terminal being configured to connect directly to a first set of peripheral systems directly and display, on a screen of the user interface terminal, a first selection page displaying names of the peripheral systems in the first set of peripheral systems thereby allowing a user to select a peripheral system from said first set of peripheral systems so as to transfer graphical interface control to the selected peripheral system,
    a second set of peripheral systems being connected to the user interface terminal via the control circuitry, the method comprising:
        receiving a name request from the user interface terminal,
        responding to the name request from the user interface terminal with a name representative of a menu navigation action on the user interface terminal;
        upon receipt of graphical interface control transferred from the user interface terminal, emulating a second selection page in a same style as the first selection page generated by the user interface terminal, wherein the second selection page displays names of the peripheral systems in the second set of peripheral systems thereby allowing the user to select a peripheral system from among said second set of peripheral systems; and
        upon detecting a selection of a peripheral system from said second set of peripheral systems, transferring graphical interface control from the control circuitry to said selected peripheral system, thereby acting as a relay between said selected peripheral system and the user interface terminal.

10. A non-transitory storage medium, storing a computer program including instructions for execution by a port expansion device, said instructions, when executed by a processor of control circuitry of said port expansion device, causes the port expansion device to perform the method of claim 9.

11. A port expansion device connectable to a user interface terminal, the user interface terminal being configured to connect a first set of peripheral systems and generate and display a first selection page displaying names of the peripheral systems in said first set of peripheral systems thereby allowing a user to select a peripheral system from the first set of peripheral systems for transferring user interface control, the port expansion device comprising:
- a connector configured to connect the port extension device to the user interface terminal, and
- control circuitry configured to connect a second set of peripheral systems to the user interface terminal, the control circuitry being configured to:
  - receive a generic name request from the user interface terminal;
  - respond to the generic name by transferring user interface control from the user interface terminal to the control circuitry;
  - upon receipt of user interface control transferred from the user interface terminal, send a name request to the second set of peripheral systems and receive names of the peripheral system in the second set of peripheral systems, and
  - use the names of the peripheral systems in the second set of peripheral systems to generate and display a second selection page identifying the names of the peripheral systems in the second set of peripheral systems thereby allowing the user to select a peripheral system from the second set of peripheral systems; and
  - upon detecting a selection of a name of one of the peripheral systems from the second set of peripheral systems, transfer user interface control from the control circuitry to the selected peripheral system.

12. The port extension device according to claim 11, wherein the connector is a female connector configured to connect the port extension device to the user interface terminal.

13. The port extension device according to claim 11, further comprises wiring configured to connect the first set of peripheral systems directly to the user interface terminal via the connector.

14. The port extension device according to claim 13, further comprises further wiring configured to connect the second set of peripheral systems to the user interface terminal via the control circuitry.

15. The port extension device according to claim 11, wherein the name representative of the element on the first user interface generated by the user interface terminal comprises "NEXT," "NEXT PAGE," "MORE" or " . . . ".

16. The port extension device according to claim 11, wherein the first selection page includes elements representative of the first set of peripheral systems respectively.

17. The port extension device according to claim 11, wherein the second selection page includes elements representative of the second set of peripheral systems respectively.

18. The port extension device according to claim 11, wherein the second selection page includes an element enabling returning to the first selection page generated by the user interface terminal.

* * * * *